United States Patent
Kammerer

(10) Patent No.: US 7,124,795 B2
(45) Date of Patent: Oct. 24, 2006

(54) STUMP CUTTER DEVICE AND CUTTER INSERT UNIT FOR THE STUMP CUTTER DEVICE

(75) Inventor: Karl Kammerer, Fluorn-Winzeln (DE)

(73) Assignee: Betek Bergbau-und Hartmetalltechnik Karl-Heinz Simon GmbH & Co. KG, Aichhalden (DE)

( * ) Notice: Subject to any disclaimer, the term of this patent is extended or adjusted under 35 U.S.C. 154(b) by 111 days.

(21) Appl. No.: 10/734,093

(22) Filed: Dec. 11, 2003

(65) Prior Publication Data

US 2004/0172828 A1    Sep. 9, 2004

(30) Foreign Application Priority Data

Dec. 20, 2002    (DE)    .............................. 102 61 200

(51) Int. Cl.
| | |
|---|---|
| B27C 1/00 | (2006.01) |
| B27C 5/00 | (2006.01) |
| B27G 13/00 | (2006.01) |

(52) U.S. Cl. ................... 144/241; 144/24.12; 144/218; 144/235; 241/294; 407/118

(58) Field of Classification Search ............... 144/241, 144/240, 24.12, 218, 226, 235, 236, 230, 144/244; 241/294; 175/428; 407/47, 40, 407/118, 119; 299/111, 106, 103
See application file for complete search history.

(56) References Cited

U.S. PATENT DOCUMENTS

| | | | | |
|---|---|---|---|---|
| 4,759,394 A | * | 7/1988 | Clemenson | .................. 144/235 |
| 4,930,945 A | * | 6/1990 | Arai et al. | ..................... 407/40 |
| 4,932,813 A | * | 6/1990 | Qvart | ........................... 407/46 |
| 4,974,649 A | * | 12/1990 | Manning | .................... 144/235 |
| 4,998,574 A | * | 3/1991 | Beach et al. | ................. 144/241 |
| 5,279,345 A | * | 1/1994 | LeMaux et al. | ............. 144/235 |
| 5,497,815 A | | 3/1996 | Bowling | |
| 5,623,978 A | * | 4/1997 | Clemenson | .................. 144/235 |
| 5,957,176 A | * | 9/1999 | Stein | ........................... 144/230 |
| 6,484,766 B1 | * | 11/2002 | Falatok et al. | ........... 144/24.12 |

FOREIGN PATENT DOCUMENTS

DE    690 21 215    12/1995

* cited by examiner

Primary Examiner—Bena Miller
(74) Attorney, Agent, or Firm—Pauley Petersen & Erickson

(57) ABSTRACT

A cutting tool for a stump cutter device, having a holder and at least one cutter insert unit, wherein the cutter insert unit has a cutter head and a shank, and wherein the cutter insert unit can be connected with the holder by its shank. To achieve a simple and cost-effective tool exchange, along with the simultaneous low wear of the contact faces, the shank of the cutter insert unit respectively has at least a tapering shank section and at least a widened shank section. The holder has a recess with protrusions corresponding to the tapering shank section and an undercut area corresponding to the widened shank section and thus provides a positive connection between the shank and the holder.

16 Claims, 5 Drawing Sheets

STUMP CUTTER DEVICE AND CUTTER INSERT UNIT FOR THE STUMP CUTTER DEVICE

BACKGROUND OF THE INVENTION

1. Field of the Invention

This invention relates to a cutting tool for a stump cutter device, having a holder and at least one cutter insert unit, wherein the cutter insert unit has a cutter head and a shank, and the cutter insert unit can be connected with the holder by its shank. This invention also relates to a cutter insert unit, having a cutter head, a shank and a cutter insert, wherein the shank is arranged at an angle with respect to the cutter head, and the cutter head has a front cutting edge which is formed at least partially by a cutter insert of a mechanically resistant material.

2. Discussion of Related Art

A known cutting tool and such a cutter insert are taught by German Patent Reference DE 690 21 215 and U.S. Pat. No. 5,497,815.

Such cutting tools are used in tree stump cutting devices that have a vertical disk, which can be rotated by a motor and on which cutting tools are mounted. To remove a tree stump, the rotary disk is rotated and is lowered onto the tree stump. A portion of the stump is removed by lateral pivoting. If required, the rotary disk can also be moved in the direction toward the operator and away from the operator. If one level is removed, the rotary disk is lowered. This process is repeated until the desired area is removed.

The cutting tools are vertically mounted on the lateral faces of the rotary disk in pairs, are located opposite each other and are distributed over the circumference of the rotary disk. The cutting tools are fastened on the rotary disk by fastening elements, such as bolts or screws. The cutting tools have holes for this purpose, through which the fastening elements are guided. The holes are shaped so that the fastening elements can be mounted through them without projecting toward the outside, so that movement of the cutting tool is not impeded during operation.

Cutting tools are mounted on the circumference of the rotary disk at various angles with respect to the contact face, to obtain a wider removal area. Straight cutting tools, as well as those angled toward the left and right, are used for this purpose.

The cutting tool contains a work head equipped with a cutter insert of a mechanically resistant material which is intended to insure a sufficient service life of the cutting tool. However, damage can occur from nails around which the tree stump has grown, or from stones. The cutting tools must be easily exchangeable because of this damage and of the wear occurring during the operation.

The work head is streamlined so that it can glide over the contact face between the work head and the stump surface with little effort.

Cutting tools are known from German Patent Reference DE 690 21 215, wherein a shank is connected to the work head. The shank engages a correspondingly shaped slit in a holder, which contains holes for mounting. The correct position of the shank on the holder is achieved by a peg on the holder and a peg retaining recess in the shank. The cutting tool is fastened on the rotary disk by bolts, together with a laterally reversed cutting tool. One disadvantage of this device is the complicated structure of the holder because of the peg, and in an elaborate assembly of the parts. Furthermore, the forces occurring during the operation act on comparably small surfaces of the shank and the holder, which results in increased wear.

One-piece cutting tools are known from U.S. Pat. No. 5,497,815 in which the holder, shank and work head with a cutter plate are combined into one part. It is disadvantageous with this device for the cutting tools, which are angled with respect to the contact face, to have a complicated shape and are therefore elaborate to produce. Also, in case of damage, the entire part must be replaced each time.

SUMMARY OF THE INVENTION

It is one object of this invention to provide a cutting tool of the type mentioned above but which is optimized with regard to operating properties.

It is a another object of this invention to provide a cutter insert unit of the type mentioned above but in which a lateral wear of the cutter insert unit in the area of the cutter head is prevented and thus increases the service life of the entire cutting tool is clearly increased.

This object is achieved with the shank of the cutter insert unit respectively having at least a tapering shank section and at least a widened shank section. The holder has a recess with protrusions corresponding to the tapering shank section and an undercut area corresponding to the widened shank section and thus provides a positive connection between the shank and the holder which is particularly resistant and rugged. With this type of interlock between the shank of the cutter insert unit and the holder, forces acting on them are evenly distributed and therefore protect the material from premature wear. This connection provides an easy mounting of the cutter insert unit in the holder.

The lateral guidance of the shank of the cutter insert unit in the holder, and the exact position of the shank during mounting in the holder is achieved because the recess of the holder is cut in the shape of an open depression into the holder. The depression has a wall opposite the open side, and the cutter insert unit rests against the wall with a lateral surface of its shank. The shank is laterally guided in the mounted state between the wall and the rotating body of the stump cutting device. The wall also prevents dirt from entering the area of the recess.

In one embodiment of this invention, the shank of the cutter insert unit, or an area of the shank protrudes from the area of the recess. This is done by selecting the thickness of the material of the shank to be greater than the depth of the recess. Thus there is a braced connection between the cutter insert unit and the rotating body.

A transfer over a large surface of the forces acting on the cutter insert unit during the operation to the holder, which is gentle on the material, is achieved because the shank has a prism-shaped shank end on a widened shank section and, adjoining the undercut area, the recess in the holder has a prism-shaped section corresponding to the prism-shaped shank end. The forces acting on the cutter insert units lead to a torsional strain on the shank in the recess. Thus, the shank presses with at least one side of the prism-shaped shank end against the corresponding surface of the recess, and with the obliquely opposite face from the inside of the recess against the associated protrusion of the holder. Thus the forces are transmitted over a large surface and to a large extent parallel with the normal surface line of the interfaces, which prevents the overwinding of the shank in the recess, even with large forces. The shank can be in contact with the surfaces of the recess in at least two locations and the forces are therefore absorbed by several surfaces, which results in a reduced compressive stress on the individual surfaces.

Because the cutter insert unit heats up during the operation, it is advantageous to design the connection between the shank and the recess of the holder with a clearance fit. Thus the shank of the cutter insert device is prevented from becoming stuck in the holder because of the expansion of its material, and from damaging it. Also, because of the greater tolerances, the cutting tool can be produced more cost-effectively. The clearance fit also assures that the cutter insert unit can be replaced more easily. With the clearance fit the shank can rest against the surfaces of the recess under stress, as described above, so that a reduced compressive stress on the surfaces is achieved.

In one embodiment, the holder has, viewed in the cutting direction, a front contact face and a rear contact face ahead of and behind the recess, and the cutter insert unit has a corresponding front support face and a rear support face. Additional surfaces for receiving forces are thus formed, which leads to a further reduction of the compressive stress and therefore increases the service life of the cutting tool.

It is also necessary to prevent stressing the tapering shank section to such an extent that a mechanical overload is generated at this point. This can be achieved because the play between the tapering shank section and the protrusions is designed to be so large that under stress of the cutter insert unit the force is introduced to the inside of the protrusion, the prism-shaped sections and the front and the rear contact faces. Now the tapering shank section remains unaffected by laterally acting compression forces starting at the protrusions.

In one embodiment, the cutter head of the cutter insert unit is angled above the front and rear contact faces with respect to the shank. Because the angling only occurs above the front and rear contact faces, there is a good support of the cutter insert unit in the holder.

In one embodiment, the cutter insert unit has the same material thickness in the area of the cutter head and of the shank. This has one advantage that the cutter insert unit can be produced in a particularly efficient manner. Thus an elaborate shaping of different surface forms can be omitted.

In another embodiment, on an inside the holder has at least one protrusion for being received in an appropriately corresponding recess of the rotating body. First, a dependable and better adjustment of the cutting tool on the rotating body is thus assured, and secondly tilting of the cutting tool during operation is permanently prevented. With improved seating of the cutting tool it is possible to make the thickness of the fastening screws smaller, which permits a particularly efficient production.

In connection with a cutter insert unit having a shank arranged at an angle with respect to the cutter head, the cutter head has at least one more cutter insert in the area of the front cutting edge. This cutter insert prevents the lateral wear of the cutter insert unit in the area of the cutter head and thus increases the service life of the cutter insert unit.

In a preferred embodiment, this additional cutter insert is oriented parallel with respect to an outside located lateral section limiting the cutter head and terminates flush with the outside lateral section or protrudes above it. Thus the area of the cutter head, which is particularly subjected to abrasion, is protected.

A long-lasting protection of the cutting tool is achieved because the further cutter insert is made, at least in sections, of a hardened metal, hard alloy, metal with ceramic-like coatings or of ceramic-like materials.

BRIEF DESCRIPTION OF THE DRAWINGS

This invention is explained in greater detail in view of an exemplary embodiment represented in the drawings, wherein.

DESCRIPTION OF PREFERRED EMBODIMENTS

Figure 1:
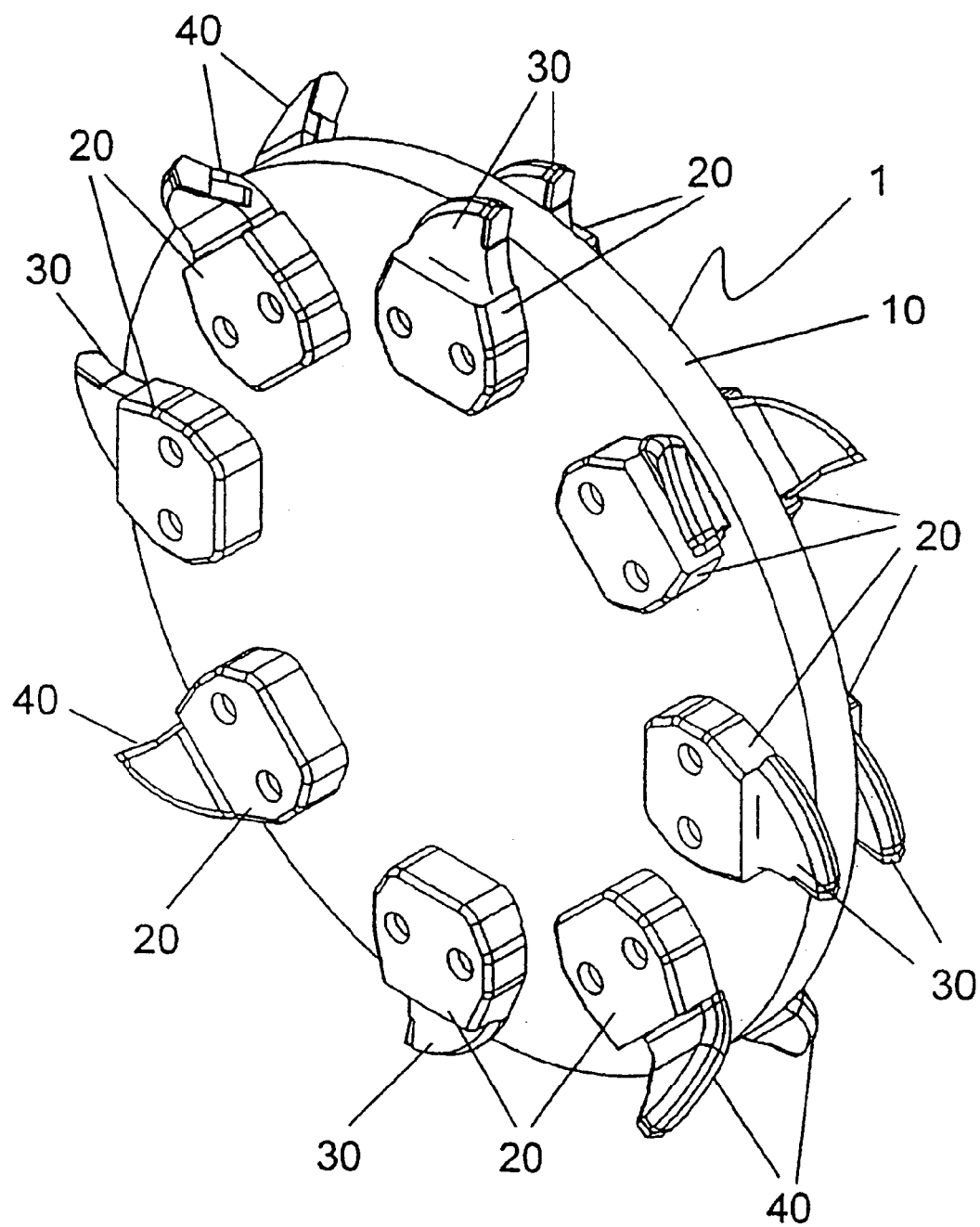
FIG. 1 shows a stump cutting device in a perspective view.
Figure 2B:
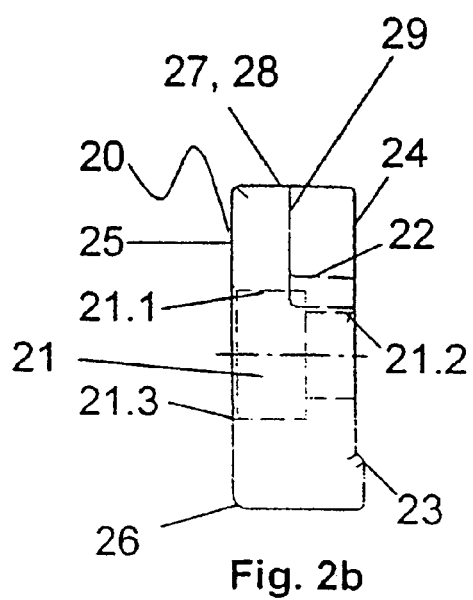
FIG. 2b shows the holder in a lateral view.
Figure 2C:
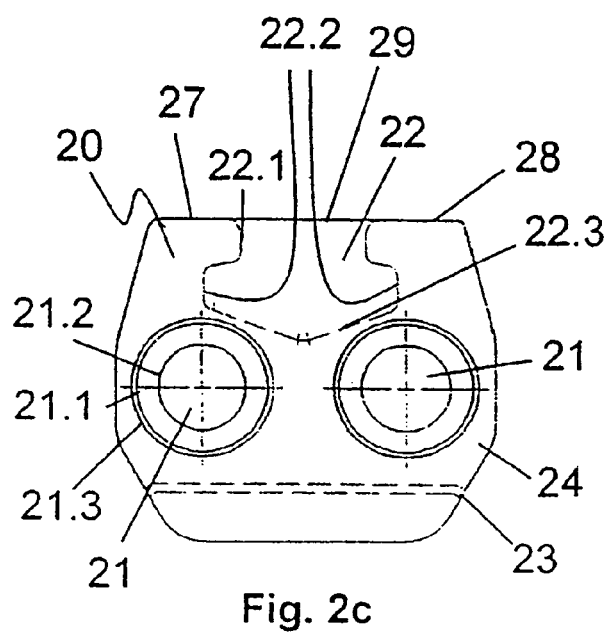
FIG. 2c shows the holder in a front view.
Figure 2A:
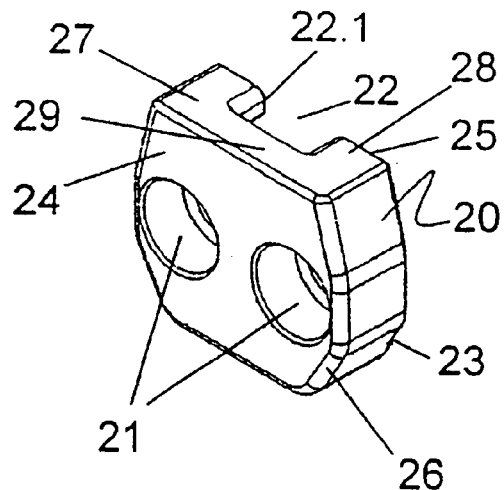
FIG. 2a shows a holder for a cutter insert unit in a perspective view.
Figure 2D:
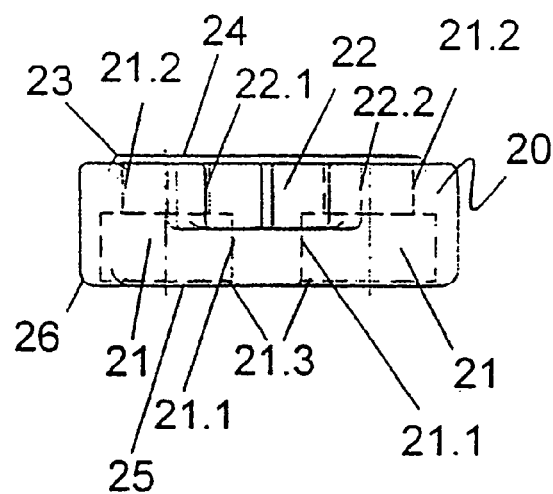
FIG. 2d shows the holder in a top view.

A stump cutting device is shown in FIG. 1. Several cutter insert units 30, 40 are fastened in pairs on both sides of the circumference of a rotating body 10, here in the form of a rotating disk, by holders 20. In the represented case, cutter insert units 30 in a straight embodiment alternate with cutter insert units 40 in an angled embodiment. Depending on the type of use, the number of cutter insert units 30, 40 used can be matched to the respective job, wherein the number of straight cutter insert units 30 and/or angled cutter insert units 40 can be varied.

The holder 20 for the cutter insert units 30,40 is shown in various views in FIG. 2a to FIG. 2d.

The holder 20 comprises a shaped body of metal having an exterior 25, and an interior 24 which points toward the rotating body 10 in the mounted state. The holder 20 also has bores 21, which are suitable for fastening the holder 20 to the rotating body 10 by screw connections.

In the upper area of the interior 24, the holder 20 has a recess 22 in the form of an open depression, which is bordered by a wall 29 located opposite the open side. In this case, the recess 22 has at least one protrusion 22.1, which initially narrows the cross section of the recess 22. This is followed by an undercut area 22.2, in which the opening of the recess 22 is increased in comparison with the opening width in the area of the protrusions 22.1. In this example, the undercut area 22.2 is limited by a prism-shaped section 22.3.

On its top, the holder 20 has a front and a rear contact face 27, 28, which border the opening of the recess 22 in the cutting direction.

Also, the holder 20 has on its interior 24 at least one protrusion 23 which in the mounted state is in an operative connection with a corresponding recess in the rotating body 10 and thus makes possible the correct seating and a correct alignment of the holder 20.

In the instant example, the bores 21 each have a penetrating bore section 21.2, a depression 21.1, and a bezel 21.3.

With the depression 21.1 it is possible for the screw head of the screw used for fastening to be positioned and protected in the holder 20 and thus cannot be damaged during the operation.

The shaped body of the holder 20 in this embodiment is formed so that it does not have any sharp edges. It therefore preferably has rounded sections 26 in the edge areas of its exterior 25.

Figure 3:
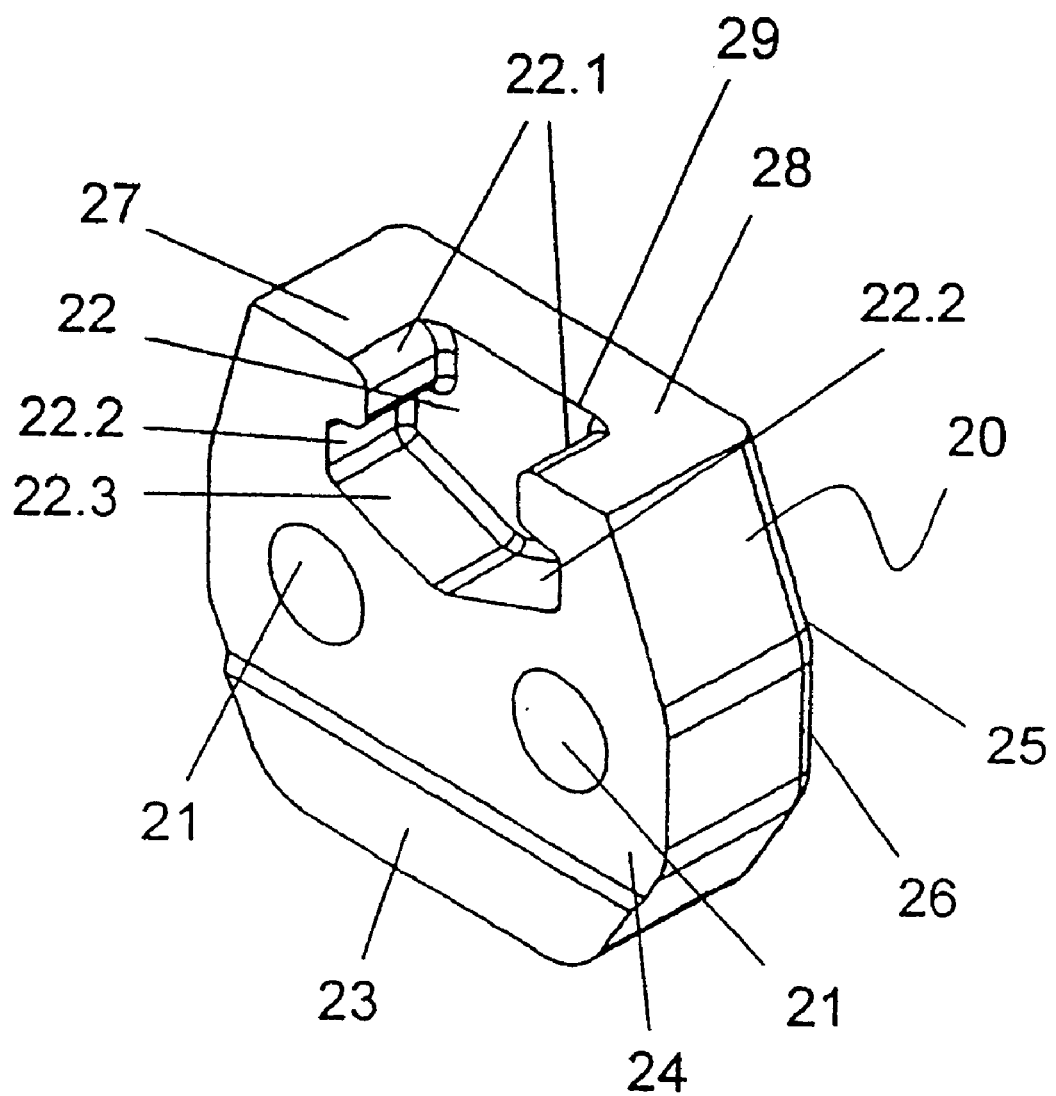
FIG. 3 shows a counterpart of the holder in a perspective view.
Figure 4B:
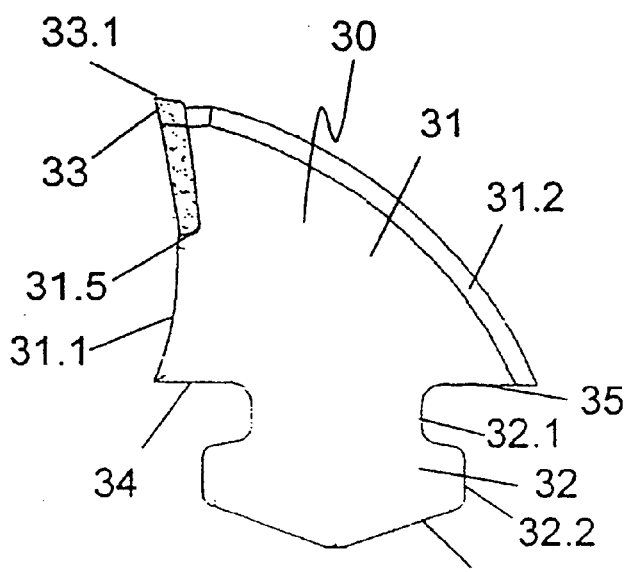
FIG. 4b shows the cutter insert unit in a front view.
Figure 4C:
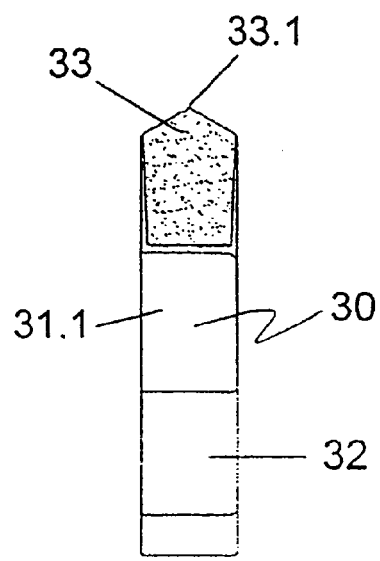
FIG. 4c shows the cutter insert unit in a lateral view, opposite a cutting direction.
Figure 4D:
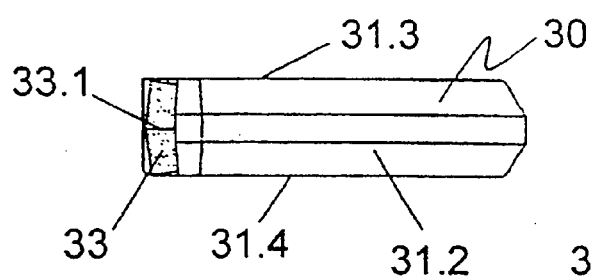
FIG. 4d shows the cutter insert unit in a top view.
Figure 4A:
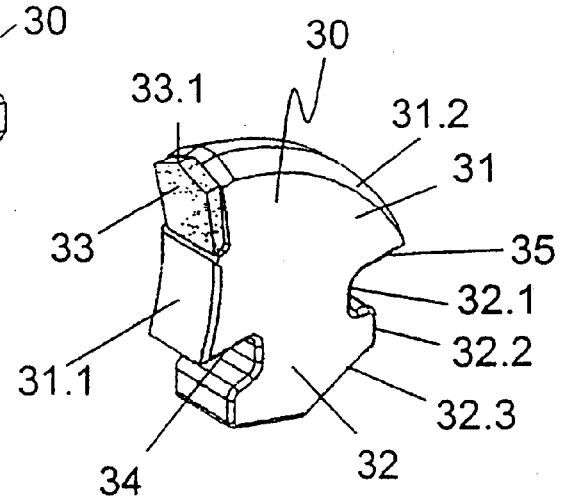
FIG. 4a shows a cutter insert unit in a straight embodiment, in a perspective view.
Figure 5B:
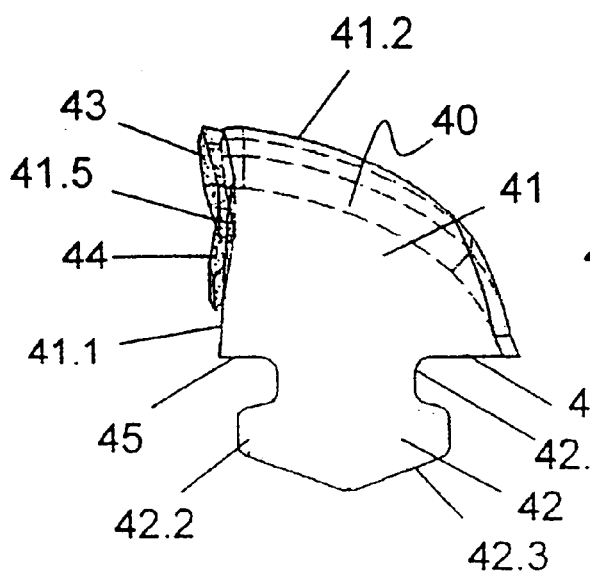
FIG. 5b shows the cutter insert unit in a front view.
Figure 5C:
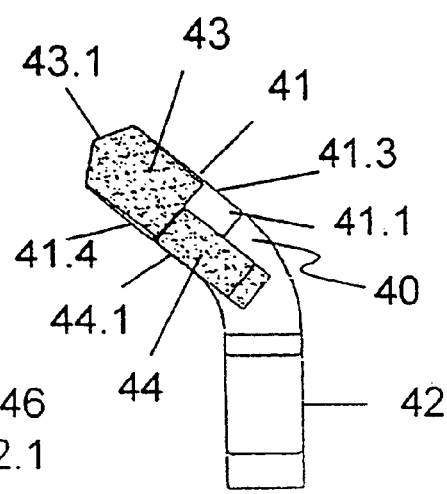
FIG. 5c shows the cutter insert unit in a lateral view opposite the cutting direction.
Figure 5D:
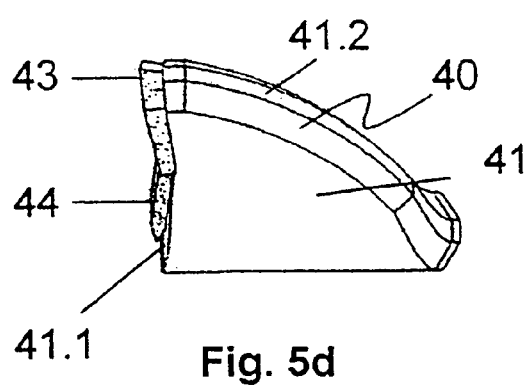
FIG. 5d shows the cutter insert unit in a top view.
Figure 5A:
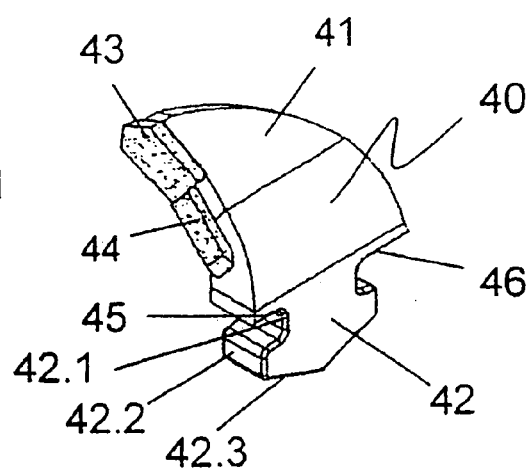
FIG. 5a shows the cutter insert unit in an angled embodiment, in a perspective view.

FIG. 3 also shows a holder 20 which, however, is embodied as a counterpart of the holder 20 from FIG. 2a to FIG. 2d. In this case the bore 21 has a screw thread 21.4. Also, the depression 21.1 is lacking. Otherwise the holder 20 has the same features as the holder 20 of FIG. 2a to FIG. 2d. For assembly, the holders 20 from FIG. 2a to FIG. 2d and the holder 20 from FIG. 3 are mounted in pairs opposite each other on the rotating body 10, wherein a screw element is passed through the bore 21 of the first holder 20 and a bore in the rotating body 10 aligned with it and is screwed into the screw thread 21.4 of the second holder 21.4.

FIGS. 4a to 4d each show cutter insert units 30 in various views.

The cutter insert unit 30 has a cutter head 31 having a lateral section 31.3 and 31.4 and, in the cutting direction, a front cutting edge 31.1 and a back 31.2, which is arranged opposite the cutting direction and whose contours are beveled or rounded. The front cutting edge 31.1 has a recess 31.5, into which a cutter insert 33 is inserted. The cutter insert 33 in this example has a cutting tip 33.1 which projects beyond the contour of the back 31.2. The cutter insert 33 is made, at least over some areas, of a hardened metal, hard alloy, metal with ceramic-like coatings or of special ceramic-like materials, of extremely slow wear and thus assures a particularly long service life of the cutting tool.

The cutter insert unit 30 also has a shank 32 with at least one tapering shank section 32.1, and at least one widened shank section 32.2 adjoining it. In a preferred embodiment the thickness of the material of the shank 32 and the cutter head 31 can be identical, which makes its production process, for example a forging process, particularly cost-effective.

The shank 32 is shaped so that the tapering shank section 32.1 corresponds to the protrusions 22.1, and the widened shank section 32.2 to the undercut area 22.2 of the recess 22 of the holder 20, and thus forms a positive connection between the shank 32 of the cutter insert unit 30 and the recess 22 of the holder 20. In the embodiment shown, the shank 32 has a prism-shaped shank end 32.3, which corresponds to the prism-shaped section 22.3 of the recess 22 of the holder 20. In the installed state, the cutter insert unit 30 is laterally held in the area of the shank 32 by the lateral surfaces of the rotating body 10, and also by the wall 29 of the holder 20. In this case the thickness of the material of the shank 32 corresponds to the depth of the recess 22 of the holder 20, or slightly protrudes above the recess 22, so that in the assembled state the cutter insert unit 30 is securely braced between the rotating body 10 and the holder 20.

In a preferred embodiment, the cutter insert unit 30 has, viewed in the cutting direction, a front and rear support surface 34, 35 which, in the installed state, are supported, viewed in the cutting direction, on the front and rear contact faces 27, 28 of the holder. Thus forces acting on the cutter head 31 are better distributed and the tapering shank section 32.1 is less mechanically stressed.

In another embodiment, the shank 32 and the corresponding recess 22 form a clearance fit.

FIGS. 5a to 5d show a cutter insert unit 40 which, in contrast to the cutter insert unit 30 from FIGS. 4a to 4d, has a cutter head 41 which is angled with respect to the shank 42. In this case the cutter head 41 has, viewed in the cutting direction, a front cutting edge 41.1, an interior lateral section 41.3 which, in the installed state, rests against the rotating body 10, an exterior lateral section 41.4 facing away from the rotating body 10, and a back 41.2. The cutter head 41 is angled so that in the installed state the cutter head 41 forms an acute angle in the range of typically 30° to 60°, preferably approximately 45°, with the lateral face of the rotating body 10 embodied as a rotating disk. In a preferred embodiment, the cutter head 41 is angled above the front and rear support faces 45, 46, which are arranged in the cutting direction. The materials of the shank 42 and the cutter head 41 can be of the same thickness.

In this embodiment, the shank 42 has the features of the shank 32 of the cutter insert unit 30 of FIGS. 4a to 4d, which is embodied straight.

In this case the shank 42 is shaped in such a way that the tapering shank section 42.1 corresponds to the protrusions 22.1, and the widened shank section 42.2 to the undercut section 22.2 of the recess 22 of the holder 20, for a positive connection between the shank 42 of the cutter insert unit 40 and the recess 22 of the holder 20. In the embodiment shown, the shank 42 has a prism-shaped shank end 42.3, which corresponds to the prism-shaped section 22.3 of the recess 22 of the holder 20. In the installed state, the cutter insert unit 40 is laterally held in the area of the shank 42 by the lateral surfaces of the rotating body 10, and also by the wall 29 of the holder 20. In this case the thickness of the material of the shank 42 corresponds to the depth of the recess 22 of the holder 20, so that in the assembled state the cutter insert unit 40 is securely braced between the rotating body 10 and the holder 20.

In a preferred embodiment, the cutter insert unit 40 has, viewed in the cutting direction, a front and rear support face 45,46 which, in the installed state, are supported, viewed in the cutting direction, on the front and rear contact faces 27, 28 of the holder.

In a further preferred variation the shank 42 and the corresponding recess 22 form a clearance fit.

On the upper end of its front cutting edge 41.1, the cutter head 41 has a recess 41.5, into which the cutter insert 43 is inserted. The cutter insert 43 has a cutter tip 43.1, which protrudes above the contour of the back 41.2. The cutter insert 43 is also made, at least over some areas, of a hardened metal, hard alloy, metal with ceramic-like coatings or of special ceramic-like materials.

In one embodiment, the cutter head 41 of the cutter insert unit 40 which is angled has at least one further cutting head 44 in the area of the front cutting edge 41.1, which has a cutting edge 44.1 oriented parallel with respect to the exterior lateral section 41.4 limiting the cutter head 41 and ends with the latter or protrudes above it. The cutter insert 44 is also made, at least over some areas, of a hardened metal, hard alloy, metal with ceramic-like coatings or of special ceramic-like materials.

In further embodiments, the shank 32, 42, and the recess 22 can be asymmetrically designed, which prevents the cutter insert units 30,40 from pointing in a wrong direction during assembly.

In comparison with the prior art, the embodiment in accordance with this invention of the holder 20 and the cutter insert unit 30, 40 have one advantage of being particularly rugged, and the forces acting on them during their operation are better distributed, which reduces the mechanical stress in the area of the transition from the cutter head 31, 41 to the shank 32, 42. Also, the replacement of the cutter insert units 30, 40 is easier in actual operations because of the clearance fit of the shaft 32,42 and the recess 22. With this two-part embodiment of the cutter insert unit 30,40 and the holder 20, it is also possible to employ different materials which, along with an extended service life, also provide cost-effective production.

German Patent Reference 102 61 200.5, the priority document corresponding to this invention, and its teachings are incorporated, by reference, into this specification.

What is claimed is:

1. A cutting tool for a stump cutter device, having a holder and at least one cutter insert unit wherein the cutter insert unit has a cutter head and a shank, and wherein the cutter insert unit is connectible with the holder by the shank, the cutting tool comprising:
    the shank (32, 42) of the cutter insert unit (30, 40) respectively having at least a tapering shank section (32.1, 42.1) and at least a widened shank section (32.2, 42.2), and the holder (20) having a recess (22) with protrusions (22.1) corresponding to the tapering shank section (32.1, 42.1) and an undercut area (22.2) corresponding to the widened shank section (32.2, 42.2) for providing a positive connection between the shank (32, 42) and the holder (20);
    wherein the cutting tool mounts on a lateral face of a rotating body of the stump cutter device.

2. The cutting tool in accordance with claim 1, wherein the recess (22) of the holder (20) is cut in the shape of an open depression into the holder (20), the open depression is formed by a wall (29) opposite the open side, and the cutter insert unit (30, 40) rests against the wall (29) with a lateral surface of the shank (32, 42).

3. The cutting tool in accordance with claim 2, wherein one of the shank (32, 42) of the cutter insert unit (30, 40) and an area of the shank (32, 42) protrudes from an area of the recess (22).

4. The cutting tool in accordance with claim 3, wherein the shank (32, 42) bass prism-shaped shank end (32.3, 42.3) and adjoining the undercut area (22.2), the recess (22) in the holder (20) has a prism-shaped section (22.3) corresponding to the prism-shaped shank end (32.3, 42.3).

5. The cutting tool in accordance with claim 4, wherein the connection between the shank (32, 42) and the recess (22) of the holder (20) forms a clearance fit.

6. The cutting tool in accordance with claim 5, wherein the holder (20) has, viewed in a cutting direction, a front contact face (27) and a rear contact face (28) ahead of and behind the recess (22), and the cutter insert unit (30, 40) has a corresponding front support face (34, 45) and a rear support face (35, 46).

7. The cutting tool in accordance with claim 6, wherein a play distance between the tapering shank section (32.1) and the protrusions (22.1) is so large that under a stress of the cutter insert unit (30, 40) a force is introduced to an inside of the protrusions (22.1), the prism-shaped sections (22.3) and the front and the rear contact faces (27, 28).

8. The cutting tool in accordance with claim 7, wherein the cutter head (41) of the cutter insert unit (40) is angled with respect to the shank (42) above the front and the rear contact faces (45, 46).

9. The cutting tool in accordance with claim 8, wherein the cutter insert unit (30, 40) is of a same material thickness at the cutter head (31, 41) and at the shank (32, 42).

10. The cutting tool in accordance with claim 9, wherein on an inside (24) of the holder (20) at least one protrusion (23) is received in an appropriately corresponding recess of a rotating body (10).

11. The cutting tool in accordance with claim 1, wherein the shank (32, 42) has a prism-shaped shank end (32.3, 42.3) and adjoining the undercut area (22.2), the recess (22) in the holder (20) has a prism-shaped section (22.3) corresponding to the prism-shaped shank end (32.3, 42.3).

12. The cutting tool in accordance with claim 1, wherein the connection between the shank (32, 42) and the recess (22) of the holder (20) forms a clearance fit.

13. The cutting tool in accordance with claim 1, wherein the holder (20) has, viewed in a cutting direction, a front contact face (27) and a rear contact toe (28) ahead of and behind the recess (22), and the cutter insert unit (30, 40) has a corresponding front support face (34, 45) and a rear support face (35, 46).

14. The cutting tool in accordance with claim 1, wherein a play distance between the tapering shank section (32.1) and the protrusions (22.1) is so large that under a stress of the cutter insert unit (30, 40) a force is introduced to an inside of the protrusions (22.1), the prism-shaped sections (22.3) and front and rear contact faces (27, 28).

15. The cutting tool in accordance with claim 1, wherein the cutter head (41) of the cutter insert unit (40) is angled with respect to the shank (42) above front and rear contact faces (45, 46).

16. The cutting tool in accordance with claim 1, wherein the cutter insert unit (30, 40) is of a same material thickness at the cutter head (31, 41) and at the shank (32, 42).

* * * * *